United States Patent
Lahey et al.

(10) Patent No.: US 6,568,599 B2
(45) Date of Patent: May 27, 2003

(54) DISPOSABLE COUPON CARD PROVIDING A PLURALITY OF COUPON DISCOUNT OFFERS

(76) Inventors: Dennis William Lahey, 410 Kittiver Ct., Neenah, WI (US) 54956; Matthew David Lahey, 857 N. LaSalle Dr. Apt. 3, Chicago, IL (US) 60610

( * ) Notice: Subject to any disclaimer, the term of this patent is extended or adjusted under 35 U.S.C. 154(b) by 0 days.

(21) Appl. No.: 09/783,168

(22) Filed: Feb. 15, 2001

(65) Prior Publication Data

US 2002/0011521 A1 Jan. 31, 2002

Related U.S. Application Data

(60) Provisional application No. 60/234,284, filed on Sep. 21, 2000, and provisional application No. 60/186,993, filed on Mar. 6, 2000.

(51) Int. Cl.[7] .............................................. G06K 19/00
(52) U.S. Cl. ...................... 235/487; 235/375; 235/494; 705/14
(58) Field of Search ................................ 235/375, 380, 235/487, 494, 383, 462.01, 462.13; 283/56, 70, 99; 705/14

(56) References Cited

U.S. PATENT DOCUMENTS

| | | | | |
|---|---|---|---|---|
| 4,195,864 A | * | 4/1980 | Morton et al. ................. | 283/56 |
| 5,002,313 A | * | 3/1991 | Salvatore ................... | 283/56 X |
| 5,008,519 A | * | 4/1991 | Cunningham et al. ...... | 235/383 |
| 5,139,286 A | * | 8/1992 | Gold .......................... | 283/56 X |
| 5,308,120 A | * | 5/1994 | Thompson .................... | 283/70 |
| 5,468,021 A | | 11/1995 | Ovadia | |
| 5,483,052 A | | 1/1996 | Smith, III et al. | |
| 5,612,527 A | * | 3/1997 | Ovadia ........................ | 235/383 |
| 5,865,470 A | * | 2/1999 | Thompson .................... | 283/70 |
| 6,076,068 A | | 6/2000 | DeLapa et al. | |
| 6,099,043 A | * | 8/2000 | Story ........................... | 283/99 |
| 6,241,287 B1 | * | 6/2001 | Best et al. ................. | 283/70 X |
| 6,314,406 B1 | * | 11/2001 | O'Hagan et al. ............. | 705/14 |
| 2001/0042008 A1 | * | 11/2001 | Hull et al. .................... | 705/14 |
| 2002/0130510 A1 | * | 9/2002 | Thompson et al. ........... | 283/61 |
| 2002/0130511 A1 | * | 9/2002 | Thompson et al. ........... | 283/81 |

FOREIGN PATENT DOCUMENTS

FR          2 656 130 A   *   6/1991

OTHER PUBLICATIONS

Computer Reseller News, Nov. 15, 1999 "POS arena waits for costs to come down–Two–dimensional bar codes begin to make mark."
Supermarket News, Jan. 12, 1998 "Advanced bar codes could sprout soon."
Traffic Management, Apr. 1995 "2–D or not 2–D".

* cited by examiner

*Primary Examiner*—Michael G. Lee
*Assistant Examiner*—Jared J. Fureman

(57) ABSTRACT

A method is described for providing a plurality of coupon discount offers from one or more manufacturers to a consumer consisting of a disposable coupon card and a two-dimensional bar code printed on the disposable card. Reference numbers for each coupon discount offer are encoded into the two-dimensional bar code. Additionally a list consisting of product and coupon discount offer information is printed on the card. Various methods of delivering the disposable coupon card to the consumer including paper inserts placed in newspapers, paper circulars distributed by retailers, magazines, direct mail pieces, insertion in packages for consumer products, and handing the disposable coupon card directly to a consumer are also described.

9 Claims, 2 Drawing Sheets

DISPOSABLE COUPON CARD PROVIDING A PLURALITY OF COUPON DISCOUNT OFFERS

CROSS-REFERENCE TO RELATED APPLICATIONS

The benefit of the following United States provisional patent applications is claimed:

| application Ser. No.(s) | Filing Date |
|---|---|
| 60/234,284 | Sep. 21, 2000 |
| 60/186,993 | Mar. 06, 2000 |

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of Invention

This invention relates generally to the field of coupon discount offers and specifically to an improved method for the distribution and redemption of a plurality of manufacturer coupon offers without the necessity of multiple paper coupons.

2. Description of the Related Art

Currently a popular method of promoting consumer products is for manufacturers to offer paper coupons to a consumer which provide discounts on specific products when purchased at a retail store. Over 250 billion paper coupons are distributed annually.

Coupons for products from different manufacturers are often combined by a third party and delivered to the consumer in one common vehicle. An example of this would be paper coupons from a variety of manufacturers printed on pages in what is known as a "free standing insert." This insert is then placed in a Sunday newspaper.

A retailer may also place coupons from different manufacturers in an advertising vehicle such as an insert in a newspaper or retail circular distributed within a store. These coupons are authorized and redeemed by a manufacturer even though they are placed by a retailer in the advertising for that retailer. Because these coupons from a manufacturer appear in the advertising of a retailer they are commonly referred to as manufacturer "in ad" coupons.

A linear bar code is printed on each paper coupon from a manufacturer. These familiar black and white vertical stripes are also referred to in the industry as a "symbology" In this case the linear bar code is a linear symbology since data is encoded in one direction along the horizontal axis. More recently a two-dimensional bar code or two-dimensional symbology has been and is being used in some industries to encode a large amount of data into a small space. With this two-dimensional symbology, data is encoded in two directions, along the horizontal axis and the vertical axis. Various types of linear and two dimensional symbologies are available today.

The term "linear bar code" when used in the description of this invention refers specifically to the EAN 128 linear symboloy that is broadly used in the consumer packaged goods industry to encode data on manufacturer coupons. The term "two-dimensional bar code" when used in the description of this invention refers to any two-dimensional symbology.

The linear bar code when scanned at the point of sale identifies a manufacturer offering a coupon discount offer, a product to which the coupon discount offer applies, the number of purchase multiples required, an amount of the coupon discount savings, an account or program to be charged, and an expiration date. The linear bar code is usually scanned at the point of sale so that the purchase can be verified electronically and the appropriate coupon savings deducted from the total amount of the purchase. The coupon is then collected from the shopper at the point of sale and physically submitted by the retailer to the manufacturer or his agent for reimbursement.

The current method of distributing and redeeming multiple paper coupons from different manufacturers is inefficient and inconvenient. The consumer must clip each coupon individually from the delivery vehicle. Multiple coupons must be organized, carried to and throughout the store, and redeemed at the point of sale. Also, the handling of multiple paper coupons by the cashier at the time of redemption is cumbersome thereby slowing down the checkout process.

BRIEF SUMMARY OF THE INVENTION

The principal object of the present invention is to provide a method of economically delivering a plurality of coupon discount offers from one or more manufacturers for one or more products to a large number of consumers in a manner that maximizes convenience for the shopper.

It is also an objective of the present invention to provide a method for a retailer to quickly redeem a plurality of coupon discount offers at the point of sale.

The foregoing objectives can be accomplished by using a disposable coupon card that contains coupon discount offers for a number of individual products from one or more manufacturers. Identification data for each coupon discount offer is encoded into a two-dimensional bar code and printed on one side of the disposable coupon card. Unlike a linear bar code printed on a paper coupon that contains identification data for one coupon discount offer, a two-dimensional bar code will contain identification data for a plurality of coupon discount offers. This encoded identification data printed on the disposable coupon card is read at the retail point of sale for electronic verification that the required products were actually purchased. At that time the appropriate coupon savings is deducted from the total amount of the purchase.

The disposable coupon card is constructed of paper or lightweight plastic and therefore can be economically distributed to a large number of consumers. The disposable coupon card can be delivered by a variety of distribution vehicles including paper inserts placed in newspapers; paper circulars distributed by retailers, magazines, and direct mail pieces. The disposable coupon card can also be inserted in packages for consumer products or handed directly to a consumer in or near a retail establishment.

Unlike paper coupons that have to be individually clipped and organized, and individually taken to the retail store, the present invention overcomes the deficiencies of the related art by providing a method for the consumer to redeem a plurality of coupons with one disposable coupon card. And unlike paper coupons, the retailer handles only one card at the point of sale.

DESCRIPTION OF THE PREFERRED EMBODIMENT

Figure 1:
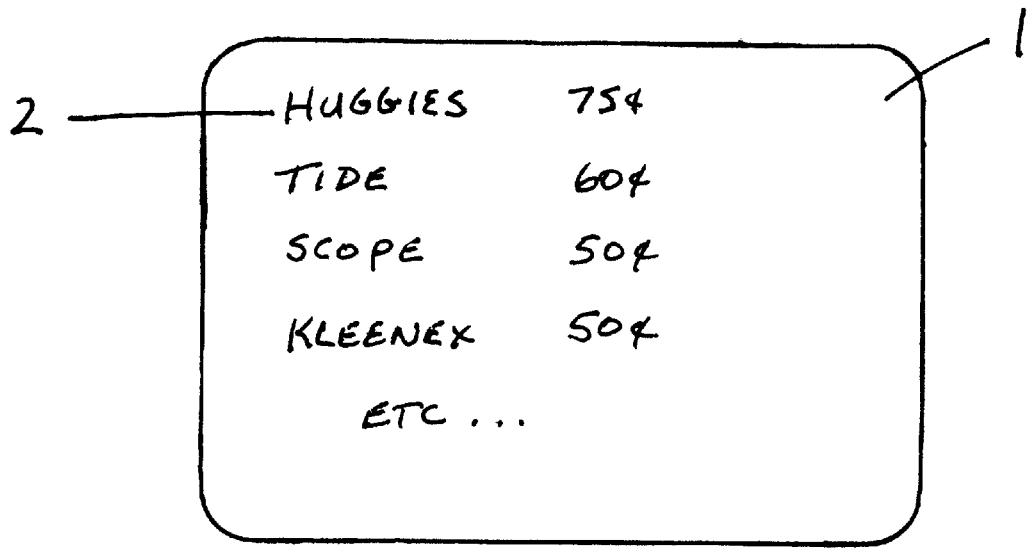
FIG. 1 is a front view of the disposable coupon card showing a list of products and coupon discount offers

A front view of the disposable coupon card is shown in FIG. 1. The disposable coupon card 1 is approximately the size of a credit card and the preferred material from which it is constructed is paper. Plastic may also be used as an alternate material. Printed on the front of the disposable coupon card 1 is a list 2 comprising product and discount offer information. For each product listed on the card there is a corresponding discount offer amount. The list serves as a reminder to the consumer while shopping. The preferred location for the list of product and discount offer information is the front of the disposable coupon card. An alternative location for the list is on the back of the card.

Figure 2:
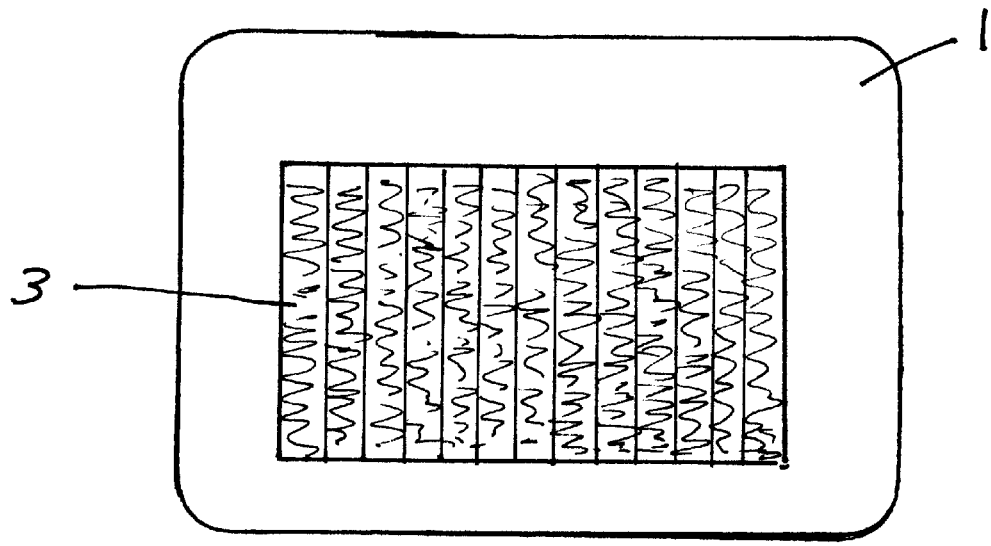
FIG. 2 is a back view of the disposable coupon card showing a two-dimensional bar code

A back view of the disposable coupon card is shown in FIG. 2. A two-dimensional bar code 3 is printed on the back of the disposable coupon card 1. The preferred location for the two-dimensional bar code is on the back of the card. As an alternative location the two-dimensional bar code may be printed on the front of the card.

The two-dimensional bar code 3 contains identification data that has been encoded. The encoded identification data comprises reference numbers for each coupon discount offer from one or more manufacturers. The reference numbers identify a manufacturer providing the coupon discount offer, a product to which the coupon discount offer applies, and an amount of discount being offered. The two-dimensional bar code contains identification data for each coupon discount offer on the disposable coupon card.

Two-dimensional bar codes have been used for a number of years in a variety of applications to encode a large amount of information in a small space. Unlike a linear bar code, which contains data encoded along a horizontal axis, a two-dimensional bar code contains data encoded along both the horizontal and the vertical axis. With a two-dimensional bar code more than one kilobyte of information can be encoded in less than one square inch of space.

Although a two-dimensional bar code is being applied in a number of different industries there in no known instance of a two-dimensional bar code being printed on a disposable card to provide a plurality of coupon discount offers. Unlike the linear bar code currently printed on a paper coupon to identify one coupon discount offer, the two-dimensional bar code allows for many coupon discount offers to be printed in a relatively small space.

Figure 3:
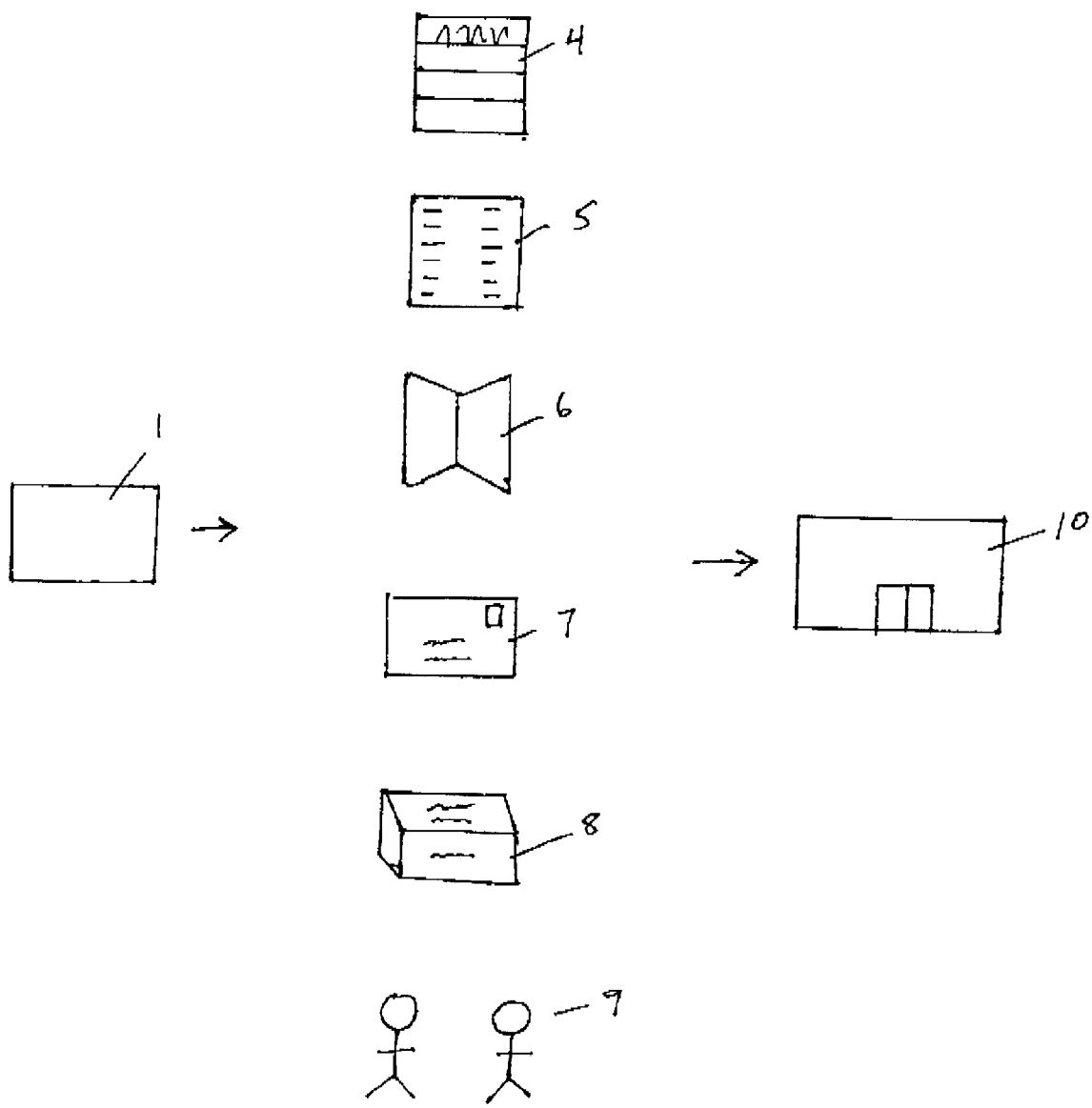
FIG. 3 shows the process of distributing and redeeming the disposable coupon card

FIG. 3 shows the process of distributing and redeeming the disposable coupon card. The disposable coupon card 1 is delivered to the consumer by a variety of vehicles comprising paper inserts placed in newspapers 4, paper circulars distributed by retailers 5, magazines 6, direct mail pieces 7, insertion in packages for consumer products 8, and handing the disposable coupon card to a consumer in or near a retail store 9. The disposable coupon card is carried to a retail outlet 10 by the consumer and together with one or more of the products listed on the card is taken to the cash register where the coupon discount offers are redeemed. The two-dimensional bar code is decoded by means of a reading device at the point of sale that is linked to the checkout scanning system of the retailer. At that point the system will verify that the appropriate products were purchased and the appropriate discounts will be applied.

The described invention differs significantly from a popular method of providing price discounts in the grocery industry known as "frequent shopper" cards. These cards, distributed by retailers, are usually made of plastic and are not considered disposable. In fact the intention is that they be used repeatedly to encourage more frequent shopping at a particular retailer. The price discounts offered to consumers using "frequent shopper" cards are paid by the retailer out of funds earned from manufacturers in the form of promotional allowances. In the case of the present invention, the coupon discount offers are actually authorized by manufacturers and paid for directly by manufacturers through a reimbursement process. This is true whether the disposable coupon card is delivered within the advertising of a retailer or by a third party in a delivery vehicle common to one or more manufacturers.

The present invention provides a method of economically delivering a plurality of coupon discount offers to a large number of consumers in a convenient form. Methods of mass delivery comprising paper inserts placed in newspapers, paper circulars distributed by retailers, magazines, direct mail pieces, insertion in packages for consumer products, and handing directly to a consumer, can be used economically to distribute the disposable coupon card. Additionally the disposable coupon card eliminates the need for the shopper to clip, organize and carry individual paper coupons to the store. The present invention also provides a method for the retailer to quickly redeem a plurality of coupon discount offers. Unlike paper coupons that are cumbersome to handle, the disposable coupon card can be quickly and easily redeemed at the point of sale.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method for providing a plurality of coupon discount offers from one or more manufacturers to a consumer for products purchased at a retail establishment comprising:
    a disposable coupon card;
    a two-dimensional bar code printed on said disposable coupon card wherein said two-dimensional bar code comprises identification data that has been encoded wherein said identification data that has been encoded comprises reference numbers for a coupon discount offer contained within said plurality of coupon discount offers wherein said reference numbers consisting of identification of a manufacturer providing said coupon discount offer, a product to which said coupon discount offer applies, and an amount of discount being offered for each coupon discount offer.

2. The method in accordance with claim 1, wherein said disposable coupon card is approximately the size of a credit card and manufactured from paper or plastic.

3. The method in accordance with claim 1, wherein said identification data that has been encoded comprises reference numbers for each said coupon discount offer contained within said plurality of coupon discount offers.

4. The method in accordance with claim 1, further including a list printed on said disposable coupon card comprising product and discount offer information.

5. A method for providing a plurality of coupon discount offers from one or more manufacturers to a consumer for products purchased at a retail establishment comprising:

a disposable coupon card;

a two-dimensional bar code comprising encoded data printed on said disposable coupon card wherein said encoded data comprises reference numbers wherein said reference numbers consisting of identification of a manufacturer, a product, and an amount of discount for each coupon discount offer contained within said plurality of coupon discount offers;

a means of delivering said disposable coupon card to said consumer.

6. The method in accordance with claim 5, wherein said means of delivering said disposable coupon card to said consumer comprises paper inserts placed in newspapers, paper circulars distributed by retailers, magazines, direct mail pieces, insertion in packages for consumer products, and handing said disposable card to a consumer in or near a retail store.

7. A method for providing a plurality of coupon discount offers from one or more manufacturers to a consumer for products purchased at a retail establishment comprising:

wherein a two-dimensional bar code comprising identification data that has been encoded is printed on a disposable coupon card;

wherein said identification data that has been encoded comprises reference numbers;

wherein said reference numbers consisting of identification of a manufacturer, a product, and an amount of discount for each coupon discount offer contained within said plurality of coupon discount offers;

wherein said disposable coupon card is delivered to said consumer by means comprising paper inserts placed in newspapers, paper circulars distributed by retailers, magazines, direct mail pieces, insertion in packages for consumer products, and handing said disposable coupon card to a consumer in or near a retail store;

wherein said disposable coupon card is taken to a retail store;

wherein said two-dimensional bar code is decoded by means of a reading device at a point of sale.

8. The method in accordance with claim 7, wherein said disposable coupon card is approximately the size of a credit card and manufactured from paper or plastic.

9. The method in accordance with claim 7, further including a list printed on said disposable coupon card comprising product and discount offer information.

\* \* \* \* \*